Nov. 4, 1947.   A. WARMISHAM   2,430,150
OPTICAL OBJECTIVE
Filed Sept. 27, 1943   3 Sheets-Sheet 1
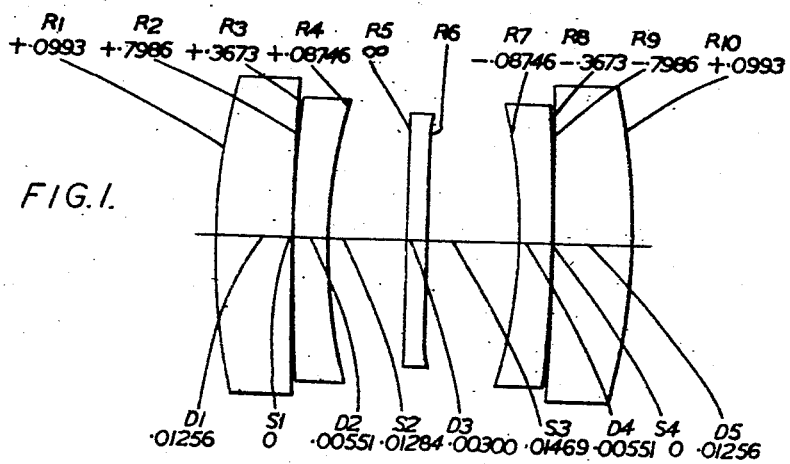
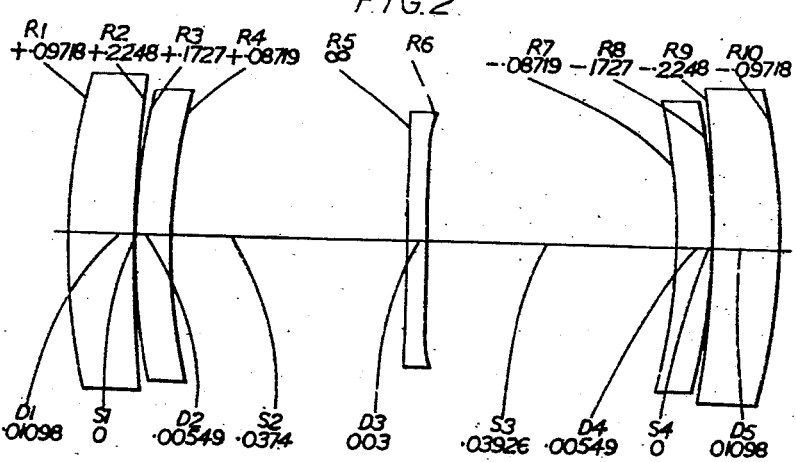
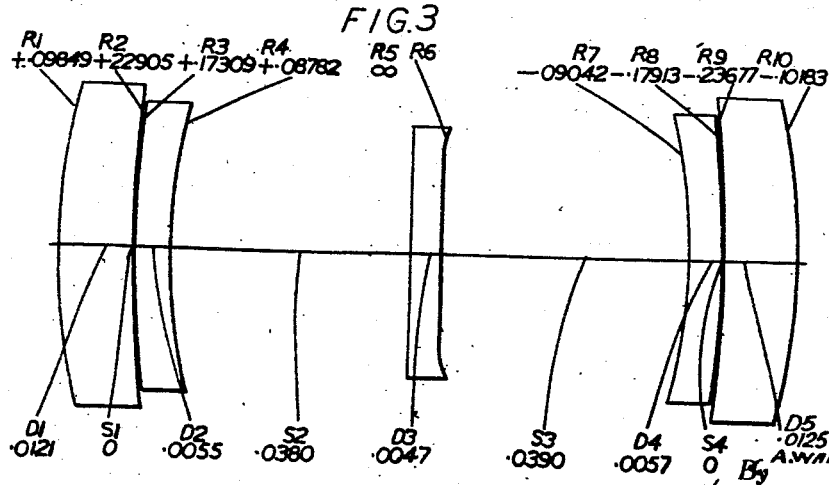
Inventor
A. WARMISHAM
By
Attorneys Inventor
A. WARMISHAM
By
Attorneys

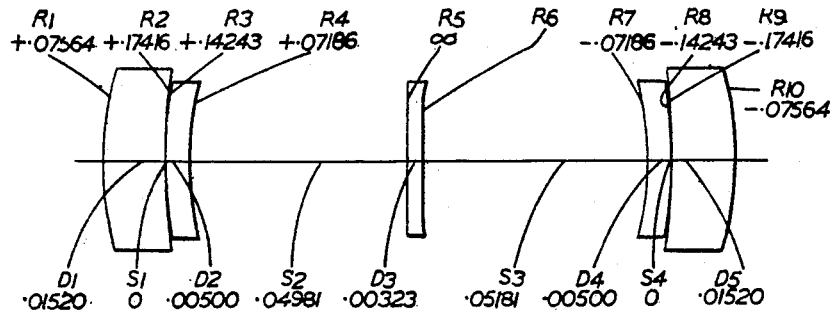
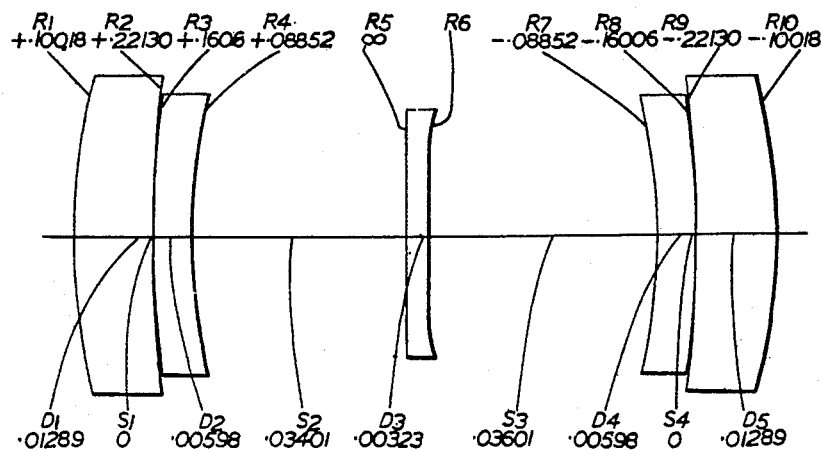
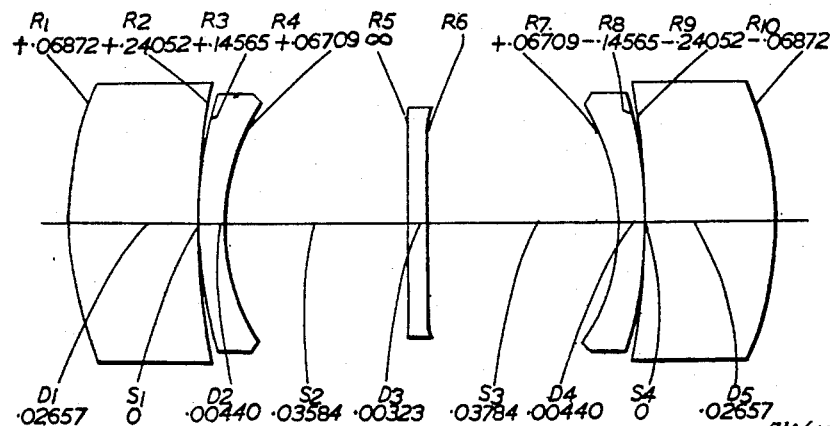

Patented Nov. 4, 1947

2,430,150

UNITED STATES PATENT OFFICE 2,430,150

OPTICAL OBJECTIVE

Arthur Warmisham, Leicester, England, assignor to Taylor, Taylor & Hobson Limited, Leicester, England, a company of Great Britain Application September 27, 1943, Serial No. 503,974
In Great Britain August 25, 1942

22 Claims. (Cl. 88—57)

This invention relates to an optical objective, corrected for spherical and chromatic aberrations, coma, astigmatism and distortion, and intended more especially for use as a process objective, comprising two parts arranged approximately holosymmetrically (that is with the two parts geometrically similar but not necessarily identical in scale disposed on opposite sides of a stop position from which they are axially spaced at distances bearing the same ratio as the sizes of the parts), the two parts usually consisting of equal halves arranged symmetrically with respect to the stop position to give copying at unit magnification.

In the objective according to the present invention the two parts, each consisting of refracting elements, are individually corrected for astigmatism with respect to the stop position, whilst spherical aberration is corrected by means of a substantially afocal correcting surface located substantially at the stop position.

The correcting surface may be paraxially afocal, in which case it will consist of a surface of revolution generated by rotation about the $x$-axis (that is the optical axis of the objective) of a curve of the form $$x = Ay^4 + \ldots \text{ higher powers of } y$$

wherein the coefficients $A \ldots$ are such that the surface will correct for the spherical aberration of the refracting components. It may sometimes be preferable, however, instead of using a paraxially afocal surface, to make the surface afocal for a selected zone such that the chromatic difference of spherical aberration is reduced to a minimum. This necessitates that the surface shall have slight curvature at its axial point, and the equation of the generating curve will become $$x = \frac{1}{2}\frac{y^2}{b} + Ay^4 + \ldots \text{ higher powers of } y$$

wherein $b$ is a constant large in comparison with the equivalent focal length of the objective. For such a surface to be substantially afocal for a selected zone of $h$, the quantities $b$, $A$ and $h$ should be interrelated by the equation $b = -1/(4Ah^2)$.

Figure 4:
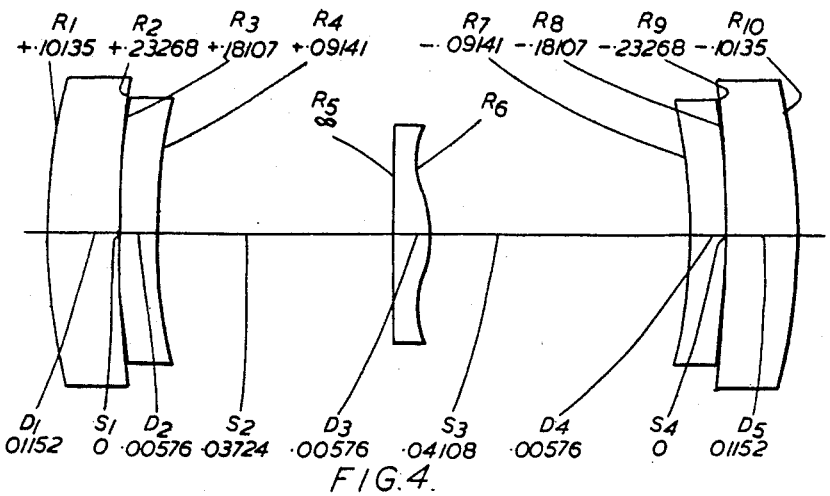
Figure 5:
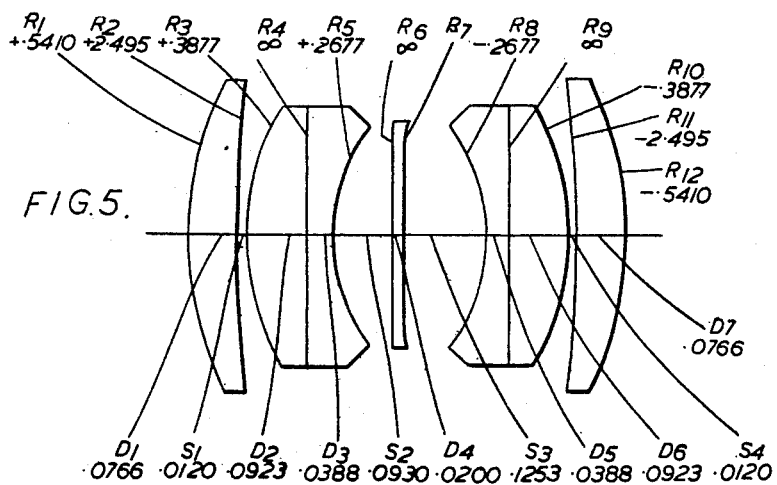
Figure 6:
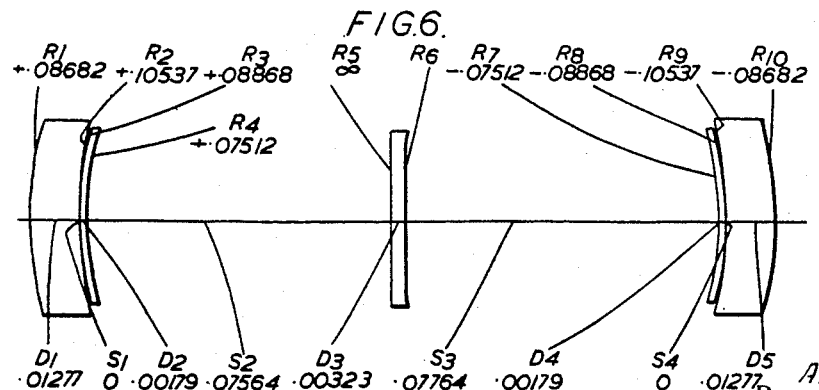

Figures 1 to 9 of the accompanying drawings respectively illustrate nine convenient practical examples of objective according to the invention, and numerical data for such examples are given in the following tables, in which $R_1 R_2 \ldots$ represent the radii of curvature of the individual surfaces, the positive sign indicating that the surface is convex to the front and the negative that it is concave thereto, $D_1 D_2 \ldots$ represent the axial thicknesses of the individual elements, and $S_1 S_2 \ldots$ the axial lengths of the air spaces between the components, the equation to the generating curve being given for the afocal correcting surface instead of its radius of curvature. The tables also give the mean refractive index for the D-line and the Abbé V number of the material of which each element is made.

Example I

[Equivalent focal length .995]

| Radius | Thickness or Air Separation | Refractive Index $n_D$ | Abbé V Number |
|---|---|---|---|
| $R_1 + .09930$ | $D_1$ .01256 | 1.615 | 51.1 |
| $R_2 + .7986$ | $S_1$ .00 | | |
| $R_3 + .3673$ | $D_2$ .00551 | 1.613 | 44.0 |
| $R_4 + .08746$ | $S_2$ .01284 | | |
| $R_5$ ∞ | $D_3$ .00300 | 1.613 | 58.5 |
| $R_6$ $x = 32.0y^4 +$ higher even powers of $y$. | $S_3$ .01469 | | |
| $R_7 - .08746$ | $D_4$ .00551 | 1.613 | 44.0 |
| $R_8 - .3673$ | $S_4$ .00 | | |
| $R_9 - .7986$ | $D_5$ .01256 | 1.615 | 51.1 |
| $R_{10} - .09930$ | | | |

Example II

[Equivalent focal length 1.000]

| Radius | Thickness or Air Separation | Refractive Index $n_D$ | Abbé V Number |
|---|---|---|---|
| $R_1 + .09718$ | $D_1$ .01098 | 1.615 | 55.0 |
| $R_2 + .2248$ | $S_1$ .00 | | |
| $R_3 + .1727$ | $D_2$ .00549 | 1.613 | 44.0 |
| $R_4 + .08719$ | $S_2$ .0374 | | |
| $R_5$ ∞ | $D_3$ .003 | 1.613 | 58.5 |
| $R_6$ $x = 22.17y^4 +$ higher even powers of $y$. | $S_3$ .03926 | | |
| $R_7 - .08179$ | $D_4$ .00549 | 1.613 | 44.0 |
| $R_8 - .1727$ | $S_4$ .00 | | |
| $R_9 - .2248$ | $D_5$ .01098 | 1.615 | 55.0 |
| $R_{10} - .09718$ | | | |

It will be noticed that each of these examples is exactly symmetrical about the stop position at which the afocal correcting surface $R_6$ is disposed, except only that the airgap $S_2$ is less than the airgap $S_3$ by an amount equal to the air equivalent of the thickness of the plate bearing the correcting surface.

In each example, all four lens components are simple and of meniscus shape with their concave faces turned towards the stop position, the outer components being convergent and the inner components divergent.

In both cases the two halves are individually corrected for astigmatism with respect to the stop position, and the coma and distortion balance out owing to the symmetrical arrangement, whilst the curvature of the surfaces are so chosen as to give a substantially flat field. The examples are also corrected for chromatic aberrations. The residual spherical aberration of the two halves is substantially balanced out by that due to the deformation from the true plane surface of the afocal correcting surface, which owing to its location at the stop position does not materially interfere with the correction of the other aberrations.

The two examples are primarily intended as process objectives for copying at or near unit magnification but can readily be modified to suit other magnifications, for which it will often be desirable to depart from a symmetrical arrangement of the two equal halves and to arrange the parts to be approximately geometrically similar to one another but of different sizes. Numerical data for one such example designed for a magnification of one half are given in the following table.

*Example III*

[Equivalent focal length 1.000]

| Radius | Thickness or Air Separation | Refractive Index $n_D$ | Abbé V Number |
|---|---|---|---|
| $R_1+.02849$ | | | |
| | $D_1$ .0121 | 1.615 | 55.0 |
| $R_2+.22905$ | $S_1$ .00 | | |
| $R_3+.17309$ | | | |
| | $D_2$ .0055 | 1.613 | 44.0 |
| $R_4+.08782$ | | | |
| $R_5$ ∞ | $S_2$ .0380 | | |
| | $D_3$ .0047 | 1.615 | 55.0 |
| $R_6$ $x=19.47y^4+$ higher even powers of $y$. | | | |
| | $S_3$ .0390 | | |
| $R_7-.09042$ | | | |
| | $D_4$ .0057 | 1.613 | 44.0 |
| $R_8-.17913$ | $S_4$ .00 | | |
| $R_9-.23677$ | | | |
| | $D_5$ .0125 | 1.615 | 55.0 |
| $R_{10}-.10183$ | | | |

The above examples each employ a paraxially afocal correcting surface, but as mentioned above it will sometimes be preferable in practice to make the surface afocal for a selected zone such as to reduce the chromatic difference of spherical aberration to a minimum. Numerical data for one such example are given in the following table. In this example the correcting surface is slightly concave to the front at the axis (the radius of curvature at the axial point being 11.387 times the equivalent focal length) and is made afocal for a zone of radius .032, the full radius of the stop being 0.48.

*Example IV*

[Equivalent focal length 1.000]

| Radius | Thickness or Air Separation | Refractive Index $n_D$ | Abbé V Number |
|---|---|---|---|
| $R_1+.10135$ | | | |
| | $D_1$ .01152 | 1.615 | 55.0 |
| $R_2+.23268$ | $S_1$ 0 | | |
| $R_3+.18107$ | | | |
| | $D_2$ .00576 | 1.613 | 44.0 |
| $R_4+.09141$ | | | |
| $R_5$ ∞ | $S_2$ .03724 | | |
| | $D_3$ .00576 | 1.615 | 55.0 |
| $R_6$ $x=-.0438y^2+21.50y^4+$ higher even powers of $y$. | | | |
| | $S_3$ .04108 | | |
| $R_7-.09141$ | | | |
| | $D_4$ .00576 | 1.613 | 44.0 |
| $R_8-.18107$ | $S_4$ 0 | | |
| $R_9-.23268$ | | | |
| | $D_5$ .01152 | 1.615 | 55.0 |
| $R_{10}-.10135$ | | | |

The above examples all employ simple components throughout but the invention is equally applicable to objectives in which the two divergent inner components are compound, and the following is an example of such an arrangement affording the highest aperture at present available for a copying objective.

*Example V*

[Equivalent focal length 1.000. Relative Aperture F/2.8]

| Radius | Thickness or Air Separation | Refractive Index $n_D$ | Abbé V Number |
|---|---|---|---|
| $R_1+.5410$ | | | |
| | $D_1$ .0766 | 1.6133 | 59.3 |
| $R_2+2.495$ | $S_1$ .0120 | | |
| $R_3+.3877$ | | | |
| | $D_2$ .0923 | 1.6133 | 59.3 |
| $R_4$ ∞ | | | |
| | $D_3$ .0388 | 1.5795 | 40.4 |
| $R_5+.2677$ | | | |
| $R_6$ ∞ | $S_2$ .0930 | | |
| | $D_4$ .0200 | 1.6133 | 59.3 |
| $R_7$ $x=.3320y^4+$ higher even powers of $y$. | | | |
| | $S_3$ .1253 | | |
| $R_8-.2677$ | | | |
| | $D_5$ .0388 | 1.5795 | 40.4 |
| $R_9$ ∞ | | | |
| | $D_6$ .0923 | 1.6133 | 59.3 |
| $R_{10}-.3877$ | $S_4$ .0120 | | |
| $R_{11}-2.495$ | | | |
| | $D_7$ .0766 | 1.6133 | 59.3 |
| $R_{12}-.5410$ | | | |

The foregoing examples employ optical glass throughout for the elements of the objective, but improved results can be obtained in many instances by employing crystalline materials for some or all of the elements. Crystalline alkaline halides and crystalline alums are especially suitable for the purpose. The remaining four examples all employ at least one such crystal in each part of the objective.

*Example VI*

[Equivalent focal length 1.000   Relative Aperture F/12]

| Radius | Thickness or Air Separation | Refractive Index $n_D$ | Abbé V Number |
|---|---|---|---|
| $R_1+.08682$ | | | |
| | $D_1$ .01277 | 1.613 | 59.3 |
| $R_2+.10537$ | $S_1$ 0 | | |
| $R_3+.08868$ | | | |
| | $D_2$ .00179 | 1.558 | 31.5 |
| $R_4+.07512$ | | | |
| $R_5$ ∞ | $S_2$ .07564 | | |
| | $D_3$ .00323 | 1.613 | 59.3 |
| $R_6$ $x=52.66y^4+$ higher even powers of $y$. | | | |
| | $S_3$ .07764 | | |
| $R_7-.07512$ | | | |
| | $D_4$ .00179 | 1.558 | 31.5 |
| $R_8-.08868$ | $S_4$ 0 | | |
| $R_9-.10537$ | | | |
| | $D_5$ .01277 | 1.613 | 59.3 |
| $R_{10}-.08682$ | | | |

In this example, wherein the back focal length is .8972 times the equivalent focal length of the objective, the four components are all simple and the divergent two inner components are made of crystalline potassium bromide, dense barium crown glass being used for the convergent outer components. This example gives especially good correction for the chromatic aberrations.

Example VII
[Equivalent focal length 1.000]

| Radius | Thickness or Air Separation | Refractive Index $n_D$ | Abbé V Number |
|---|---|---|---|
| $R_1 +.07564$ | | | |
| | $D_1$ .01520 | 1.4801 | 50.5 |
| $R_2 +.17416$ | | | |
| | $S_1$ 0 | | |
| $R_3 +.14243$ | | | |
| | $D_2$ .00500 | 1.52365 | 39.1 |
| $R_4 +.07186$ | | | |
| | $S_2$ .04981 | | |
| $R_5 \infty$ | | | |
| | $D_3$ .00323 | 1.613 | 59.3 |
| $R_6\ x=95.20y^4+$ higher even powers of $y$. | | | |
| | $S_3$ .05181 | | |
| $R_7 -.07186$ | | | |
| | $D_4$ .00500 | 1.52365 | 39.1 |
| $R_8 -.14243$ | | | |
| | $S_4$ 0 | | |
| $R_9 -.17416$ | | | |
| | $D_5$ .01520 | 1.4801 | 50.5 |
| $R_{10} -.07564$ | | | |

In this example, whose back focal length is .9207 times the equivalent focal length of the objective, the components are all simple. The convergent outer components are each made of crystalline potash selenium alum, whose chemical formula is $KAl(SeO_4)_2 \cdot 12H_2O$, whilst the divergent inner components are made of crystalline thallium iron alum, $TlFe(SO_4)_2 \cdot 12H_2O$.

Example VIII
[Equivalent focal length 1.000]

| Radius | Thickness or Air Separation | Refractive Index $n_D$ | Abbé V Number |
|---|---|---|---|
| $R_1 +.10018$ | | | |
| | $D_1$ .01289 | 1.712 | 29.7 |
| $R_2 +.22130$ | | | |
| | $S_1$ 0 | | |
| $R_3 +.16006$ | | | |
| | $D_2$ .00598 | 1.7876 | 23.9 |
| $R_4 +.08852$ | | | |
| | $S_2$ .03401 | | |
| $R_5 \infty$ | | | |
| | $D_3$ .00323 | 1.613 | 59.3 |
| $R_6\ x=23.52y^4+$ higher even Powers of $y$. | | | |
| | $S_3$ .03601 | | |
| $R_7 -.08852$ | | | |
| | $D_4$ .00598 | 1.7876 | 23.9 |
| $R_8 -.16006$ | | | |
| | $S_4$ 0 | | |
| $R_9 -.22130$ | | | |
| | $D_5$ .01289 | 1.712 | 29.7 |
| $R_{10} -.10018$ | | | |

This example, whose back focal length is .9444 times the equivalent focal length of the objective, differs from Example VII in using alkaline halide crystals instead of alum crystals, the divergent inner components being made of caesium iodide crystal and the convergent outer components of ammonium bromide crystal.

Example IX
[Equivalent focal length 1.000]

| Radius | Thickness or Air Separation | Refractive Index $n_D$ | Abbé V Number |
|---|---|---|---|
| $R_1 +.06872$ | | | |
| | $D_1$ .02657 | 1.4817 | 40.7 |
| $R_2 +.24052$ | | | |
| | $S_1$ 0 | | |
| $R_3 +.14565$ | | | |
| | $D_2$ .00440 | 1.6984 | 34.6 |
| $R_4 +.06709$ | | | |
| | $S_2$ .03584 | | |
| $R_5 \infty$ | | | |
| | $D_3$ .00323 | 1.613 | 59.3 |
| $R_6\ x=259.2y^4+$ higher even powers of $y$. | | | |
| | $S_3$ .03784 | | |
| $R_7 -.06709$ | | | |
| | $D_4$ .00440 | 1.6984 | 34.6 |
| $R_8 -.14565$ | | | |
| | $S_4$ 0 | | |
| $R_9 -.24052$ | | | |
| | $D_5$ .02657 | 1.4817 | 40.7 |
| $R_{10} -.06872$ | | | |

This example, whose back focal length is .9221 times the equivalent focal length of the objective, employs an alkaline halide crystal, caesium bromide, for the divergent inner components and an alum crystal, potash iron alum $$KFe(SO_4)_2 \cdot 12H_2O$$

for the convergent outer components.

By "holosymmetrical" or "holosymmetrically" in the claims is meant a symmetrical system composed of two symmetrical parts which may or may not be of the same size and in which the dimensions of the components of each part are in a fixed ratio to the corresponding components of the other part.

What I claim as my invention and desire to secure by Letters Patent is:

1. An optical objective, comprising two parts each consisting of a convergent refracting component and a divergent refracting component, the two parts being arranged approximately holosymmetrically and the innermost and outermost radii being between 4.3 and 15.4 per cent of the equivalent focal length, the dimensions of one part being derived from the dimensions of one-half of an equivalent objective comprising two equal halves by multiplying said last named dimensions by a factor not less than 1.0 and not greater than 2.0 and the dimensions of the other part being derived by dividing said dimensions of one-half of said equivalent objective by the same factor, said two parts being individually corrected for astigmatism with respect to the stop position, and a substantially afocal correcting surface located substantially at the stop position for correcting for the spherical aberration of the objective, the objective also being corrected for chromatic aberrations, coma and distortion.

2. An optical objective as claimed in claim 1, in which the four components are all meniscus-shaped with their concave surfaces facing the stop position.

3. An optical objective as claimed in claim 1, in which at least one of the elements in each part of the objective is made of an alkaline halide crystal.

4. An optical objective as claimed in claim 1, in which at least one of the elements in each part of the objective is made of a crystalline alum.

5. An optical objective as claimed in claim 1, in which the afocal correcting surface consists of a surface of revolution generated by rotation about the $x$-axis of a curve of the form $$x = Ay^4 + \ldots \text{ higher powers of } y$$

wherein the coefficients A ... are such that the surface will correct for the spherical aberration of the refracting components wherein $x$ and $y$ are the parameters of a system of Cartesian coordinates whose $x$-axis coincides with the optical axis of the objective.

6. An optical objective as claimed in claim 1, in which the afocal correcting surface consists of a surface of revolution generated by rotation about the $x$-axis of a curve of the form $$x = \tfrac{1}{2}\tfrac{y^2}{b} + Ay^4 + \ldots \text{ higher powers of } y$$

wherein $b$ is a constant large in comparison with the equivalent focal length of the objective and the coefficients A ... are such that the surface will correct for the spherical aberration of the refracting components, wherein $x$ and $y$ are the parameters of a system of Cartesian coordinates whose $x$-axis coincides with the optical axis of the objective.

7. An optical objective, comprising two equal halves disposed symmetrically about a stop position, the two halves each consisting of a convergent refracting component and a divergent refracting component and being individually corrected for astigmatism with respect to the stop position, the innermost and outermost radii being between six and eleven percent of the equivalent focal length and a substantially afocal correcting surface located substantially at the stop position for correcting for the spherical aberration of the objective, the objective also being corrected for chromatic aberrations, coma and distortion.

8. An optical objective as claimed in claim 7, in which the afocal correcting surface consists of a surface of revolution generated by rotation about the $x$-axis of a curve of the form $$x = Ay^4 + \ldots \text{ higher powers of } y$$

wherein the coefficients $A \ldots$ are such that the surface will correct for the spherical aberration of the refracting components, wherein $x$ and $y$ are the parameters of a system of Cartesian coordinates whose $x$-axis coincides with the optical axis of the objective.

9. An optical objective as claimed in claim 7, in which the afocal correcting surface consists of a surface of revolution generated by rotation about the $x$-axis of a curve of the form $$x = \tfrac{1}{2}\tfrac{y^2}{b} + Ay^4 + \ldots \text{ higher powers of } y$$

wherein $b$ is a constant large in comparison with the equivalent focal length of the objective and the coefficients $A \ldots$ are such that the surface will correct for the spherical aberration of the refracting components wherein $x$ and $y$ are the parameters of a system of Cartesian coordinates whose $x$-axis coincides with the optical axis of the objective.

10. A holosymmetrical modification of the optical objective as claimed in claim 7 derived therefrom by multiplying the dimensions of one half of said objective by a factor greater than 1.0 and not greater than 2.0 and dividing the dimensions of the other half of said objective by the same factor.

11. An optical objective, comprising four simple meniscus components disposed symmetrically with their concave surfaces facing the stop position, the two outer components being convergent and the two inner components divergent, the two halves being individually corrected for astigmatism with respect to the stop position, the innermost and outermost radii being between six and eleven percent of the equivalent focal length and a substantially afocal correcting surface located substantially at the stop position for correcting for the spherical aberration of the objective, the objective also being corrected for chromatic aberrations, coma and distortion.

12. An optical objective as claimed in claim 11, in which at least one of the elements in each half of the objective is made of an alkaline halide crystal.

13. An optical objective as claimed in claim 11, in which at least one of the elements in each half of the objective is made of a crystalline alum.

14. An optical objective as claimed in claim 11, in which the afocal correcting surface consists of a surface of revolution generated by rotation about the $x$-axis of a curve of the form $$x = Ay^4 + \ldots \text{ higher powers of } y$$

wherein the coefficients $A \ldots$ are such that the surface will correct for the spherical aberration of the refracting components wherein $x$ and $y$ are the parameters of a system of Cartesian coordinates whose $x$-axis coincides with the optical axis of the objective.

15. An optical objective as claimed in claim 11, in which the afocal correcting surface consists of a surface of revolution generated by rotation about the $x$-axis of a curve of the form $$x = \tfrac{1}{2}\tfrac{y^2}{b} + Ay^4 + \ldots \text{ higher powers of } y$$

wherein $b$ is a constant large in comparison with the equivalent focal length of the objective and the coefficients $A \ldots$ are such that the surface will correct for the spherical aberration of the refracting components wherein $x$ and $y$ are the parameters of a system of Cartesian coordinates whose $x$-axis coincides with the optical axis of the objective.

16. An optical objective as claimed in claim 11, in which the radius of curvature of each of the two outermost surfaces of the objective lies between .09 and .11 times the equivalent focal length of the objective, and the radius of curvature of each of the two innermost surfaces of the objectives lies between .08 and .10 times such equivalent focal length.

17. An optical objective as claimed in claim 11, in which the two divergent components are made of an alkaline halide crystal and the two convergent components of a crystalline alum, the radii of curvature of the two outermost surfaces and of the two innermost surfaces all lying between .06 and .07 times the equivalent focal length of the objective.

18. An optical objective as claimed in claim 11, in which the radii of curvature of the two outermost surfaces and of the two innermost surfaces of the objective all lie between .06 and .07 times the equivalent focal length of the objective.

19. An optical objective, comprising four meniscus components disposed symmetrically with their concave surfaces facing the stop position, the two outer components being simple and convergent whilst the two inner components are compound and divergent, the outermost radii of curvature of said outer components lying between fifty and sixty percent and the innermost radii of curvature of said inner components lying between twenty and thirty percent and the outer radii of curvature of said inner components lying between thirty and forty percent of the equivalent focal length of said objective, the two halves being individually corrected for astigmatism with respect to the stop position, and a substantially afocal correcting surface located substantially at the stop position for correcting for the spherical aberration of the objective, the objective also being corrected for chromatic aberrations, coma and distortion.

20. An optical objective having numerical data substantially as set forth in the following table:

[Equivalent focal length 1.000]

| Radius | Thickness or Air Separation | Refractive Index $n_D$ | Abbé V Number |
|---|---|---|---|
| $R_1+.10135$ | $D_1$ .01152 | 1.615 | 55.0 |
| $R_2+.23268$ | $S_1$ 0 | | |
| $R_3+.18107$ | $D_2$ .00576 | 1.613 | 44.0 |
| $R_4+.09141$ | $S_2$ .03724 | | |
| $R_5 \infty$ | $D_3$ .00576 | 1.615 | 55.0 |
| $R_6$ $x=-.0438y^2+21.50y^4+$ higher even powers of $y$. | $S_3$ .04108 | | |
| $R_7-.09141$ | $D_4$ .00576 | 1.613 | 44.0 |
| $R_8-.18107$ | $S_4$ 0 | | |
| $R_9-.23268$ | $D_5$ .01152 | 1.615 | 55.0 |
| $R_{10}-.10135$ | | | | wherein $R_1R_2$ ... represent the radii of curvature of the individual surfaces, the positive sign indicating that the surface is convex to the front and the negative sign that it is concave thereto, $D_1D_2$ ... represent the axial thickness of the individual elements, and $S_1S_2$ ... the axial lengths of the air spaces between the components, the equation to the generating curve being given for the afocal correcting surface and wherein $x$ and $y$ are the parameters of a system of Cartesian coordinates whose $x$-axis coincides with the optical axis of the objective.

21. An optical objective having numerical data substantially as set forth in the following table:

[Equivalent focal length 1.000. Relative Aperture F/2.8]

| Radius | Thickness or Air Separation | Refractive Index $n_D$ | Abbé V Number |
|---|---|---|---|
| $R_1+.5410$ | $D_1$ .0766 | 1.6133 | 59.3 |
| $R_2+2.495$ | $S_1$ .0120 | | |
| $R_3+.3877$ | $D_2$ .0923 | 1.6133 | 59.3 |
| $R_4 \infty$ | $D_3$ .0388 | 1.5795 | 40.4 |
| $R_5+.2677$ | $S_2$ .0930 | | |
| $R_6 \infty$ | $D_4$ .0200 | 1.6133 | 59.3 |
| $R_7$ $x=.3320y^4+$ higher even powers of $y$. | $S_3$ .1253 | | |
| $R_8-.2677$ | $D_5$ .0388 | 1.5795 | 40.4 |
| $R_9 \infty$ | $D_6$ .0923 | 1.6133 | 59.3 |
| $R_{10}-.3877$ | $S_4$ .0120 | | |
| $R_{11}-2.495$ | $D_7$ .0766 | 1.6133 | 59.3 |
| $R_{12}-.5410$ | | | | wherein $R_1R_2$ ... represent the radii of curvature of the individual surfaces, the positive sign indicating that the surface is convex to the front and the negative sign that it is concave thereto, $D_1D_2$ ... represent the axial thickness of the individual elements, and $S_1S_2$ ... the axial lengths of the air spaces between the components, the equation to the generating curve being given for the afocal correcting surface and wherein $x$ and $y$ are the parameters of a system of Cartesian coordinates whose $x$-axis coincides with the optical axis of the objective.

22. An optical objective having numerical data substantially as set forth in the following table:

[Equivalent focal length 1.000]

| Radius | Thickness or Air Separation | Refractive Index $n_D$ | Abbé V Number |
|---|---|---|---|
| $R_1+.06872$ | $D_1$ .02657 | 1.4817 | 40.7 |
| $R_2+.24052$ | $S_1$ 0 | | |
| $R_3+.14565$ | $D_2$ .00440 | 1.6984 | 34.6 |
| $R_4+.06709$ | $S_2$ .03584 | | |
| $R_5 \infty$ | $D_3$ .00323 | 1.613 | 59.3 |
| $R_6$ $x=259.2y^4+$ higher even powers of $y$. | $S_3$ .03784 | | |
| $R_7-.06709$ | $D_4$ .00440 | 1.6984 | 34.6 |
| $R_8-.14565$ | $S_4$ 0 | | |
| $R_9-.24052$ | $D_5$ .02657 | 1.4817 | 40.7 |
| $R_{10}-.06872$ | | | | wherein $R_1R_2$ ... represent the radii of curvature of the individual surfaces, the positive sign indicating that the surface is convex to the front and the negative sign that it is concave thereto, $D_1D_2$ ... represent the axial thickness of the individual elements, and $S_1S_2$ ... the axial lengths of the air spaces between the components, the equation to the generating curve being given for the afocal correcting surface and wherein $x$ and $y$ are the parameters of a system of Cartesian coordinates whose $x$-axis coincides with the optical axis of the objective.

ARTHUR WARMISHAM.

REFERENCES CITED

The following references are of record in the file of this patent:

UNITED STATES PATENTS

| Number | Name | Date |
|---|---|---|
| 583,336 | Rudolph | May 25, 1897 |
| 871,559 | Beck et al. | Nov. 19, 1907 |
| 1,541,407 | Spannenberg | June 9, 1925 |
| 2,100,290 | Lee | Nov. 23, 1937 |
| 2,170,979 | Straubel | Aug. 29, 1939 |
| 2,332,930 | Rinia | Oct. 26, 1943 |
| 2,336,207 | Aklin | Dec. 7, 1943 |

FOREIGN PATENTS

| Number | Country | Date |
|---|---|---|
| 10,131 | Great Britain | 1893 |
| 14,673 | Great Britain | 1908 |
| 537,460 | France | March 3, 1922 |
| 548,384 | Great Britain | Oct. 8, 1942 |